United States Patent [19]

Imahashi

[11] Patent Number: 5,438,084
[45] Date of Patent: Aug. 1, 1995

[54] FLAME-RETARDANT POLYAMIDE-CONTAINING RESIN COMPOSITION AND FLAME RETARDANT

[75] Inventor: Takeshi Imahashi, Nagao, Japan

[73] Assignee: Kyowa Chemical Industry Co., Ltd., Kagawa, Japan

[21] Appl. No.: 371,616

[22] Filed: Jan. 12, 1995

Related U.S. Application Data

[63] Continuation of Ser. No. 27,059, Mar. 5, 1993, abandoned.

[30] Foreign Application Priority Data

Mar. 16, 1992 [JP] Japan .................................. 4-090183

[51] Int. Cl.⁶ ...................... C08L 77/02; C08L 77/06; C08K 3/02; C08K 3/22
[52] U.S. Cl. .................................. 523/440; 523/451; 523/457; 525/423
[58] Field of Search ..................... 523/440, 451, 457; 525/423

[56] References Cited

U.S. PATENT DOCUMENTS

| | | | |
|---|---|---|---|
| 3,477,982 | 11/1969 | Dijkstra | 523/451 |
| 4,845,168 | 7/1989 | Dykes | 525/423 |
| 5,130,383 | 7/1992 | Yoshino | 525/423 |

FOREIGN PATENT DOCUMENTS

| | | |
|---|---|---|
| 0278555 | 8/1988 | European Pat. Off. . |
| 0430350 | 6/1991 | European Pat. Off. . |
| 0438188 | 7/1991 | European Pat. Off. . |
| 1032983 | 6/1966 | United Kingdom ................ 525/423 |

*Primary Examiner*—John C. Bleutge
*Assistant Examiner*—D. R. Wilson
*Attorney, Agent, or Firm*—Wenderoth, Lind & Ponack

[57] ABSTRACT

A flame retardant capable of imparting a polyamide-containing resin with excellent flame retardancy without deteriorating the impact strength of the polyamide-containing resin even when it is incorporated in a small amount, and a flame-retardant polyamide-containing resin composition containing the above flame retardant and having practically sufficient impact strength. The flame retardant comprises 100 parts by weight of magnesium hydroxide, 2 to 750 parts by weight of red phosphorus and 0.2 to 250 parts by weight of an epoxy resin, and the flame-retardant polyamide-containing resin composition comprises 100 parts by weight of a polyamide-containing resin, 2 to 50 parts by weight of magnesium hydroxide, 1 to 15 parts by weight of red phosphorus and 0.1 to 5 parts by weight of an epoxy resin.

4 Claims, No Drawings

5,438,084

FLAME-RETARDANT POLYAMIDE-CONTAINING RESIN COMPOSITION AND FLAME RETARDANT

This application is a continuation of now abandoned application, Ser. No. 08/027,059, filed Mar. 5, 1993, abandoned.

FIELD OF THE INVENTION

The present invention relates to a flame retardant free from causing a decrease in impact strength of a polyamide-containing resin when the retardant is incorporated into the polyamide-containing resin, and a flame-retardant polyamide-containing resin composition.

DESCRIPTION OF RELATED ART

When tested according to a UL94VE combustion test, polyamide-containing resins show flame retardancy of HB grade or V-2 grade. Further, in processing or in a fire, polyamide-containing resins generate harmful gas such as ammonia gas, amine-containing gas or cyan gas. It is therefore desired to improve polyamide-containing resins in flame retardancy.

For improving polyamide-containing resins in flame retardancy, there are known methods in which a triazine compound such as melamine cyanurate, a halogen-containing flame retardant, magnesium hydroxide, red phosphorus or a combination of magnesium hydroxide with red phosphorus is incorporated into polyamide-containing resins. However, these methods involve the following problems.

When a triazine compound is incorporated, it is difficult to prevent the generation of ammonia gas, amine-containing gas or cyan gas in processing or in a fire. Further, when a triazine compound is incorporated into resins which should be treated at a high temperature around 300° C., such as nylon 66, it is thermally decomposed to foam, and the resins are no longer processable. Otherwise, products produced from such resins often have defects.

A halogen-containing flame retardant generates a harmful halogen gas in a fire. Another problem of a halogen-containing flame retardant is that it is liable to corrode processing machines such as a kneader and a molding machine when it is treated. Magnesium hydroxide is a nontoxic, halogen-free flame retardant, and desirably, it generates no harmful gas, nor does it corrode treating machines. When used alone, however, magnesium hydroxide is required to be incorporated into resins in a large amount in order to obtain sufficient flame retardancy. It therefore involves a problem in that the mechanical properties of resins such as impact strength decrease.

Red phosphorus is capable of giving a flame-retardant polyamide-containing resin even when incorporated in a small amount. However, it still has a problem in that the impact strength, etc., of the resin decreases. Further, red phosphorus has another problem in that phosphine is generated in processing and in a fire, and it is desirable to decrease the amount of red phosphorus in view of safety.

When a combination of magnesium hydroxide with red phosphorus is incorporated, it is difficult to increase the amount of the combined flame retardant sufficiently for obtaining a polyamide-containing resin having sufficient flame retardancy, since the polyamide-containing resin tends to show a great decrease in impact strength when the amount of a filler increases.

SUMMARY OF THE INVENTION

It is an object of the present invention to provide a flame retardant capable of imparting a polyamide-containing resin with excellent flame retardancy even when it is incorporated in a small amount.

It is another object of the present invention to provide a flame retardant capable of imparting a polyamide-containing resin with excellent flame retardancy without deteriorating the impact strength of the polyamide-containing resin.

Further, it is another object of the present invention to provide a flame-retardant polyamide-containing resin composition containing the above flame retardant and having practically sufficient impact strength.

According to the present invention, there is provided a flame retardant containing 100 parts by weight of magnesium hydroxide, 2 to 750 parts by weight of red phosphorus and 0.2 to 250 parts by weight of an epoxy resin.

Further, according to the present invention, there is provided a flame-retardant polyamide-containing resin composition containing 100 parts by weight of a polyamide-containing resin, 2 to 50 parts by weight of magnesium hydroxide, 1 to 15 parts by weight of red phosphorus and 0.1 to 5 parts by weight of an epoxy resin.

DETAILED DESCRIPTION OF THE INVENTION

The present invention provides a flame retardant and a flame-retardant polyamide-containing resin which do not contain a triazine compound, a halogen compound, etc., which are liable to cause problems concerning toxicity and treatment. The characteristic feature of the present invention is that the content of red phosphorus which generates phosphine and decreases impact strength and the content magnesium hydroxide which decreases impact strength are reduced and that an epoxy resin which produces a drastic effect as a drip preventer, which drastic effect has been found by the present inventor, is incorporated.

For example, the flame retardant of the present invention produces the following remarkable function/effect when it is incorporated into polyamide 6 to impart it with flame retardancy of 1/16 inch V-0 according to the UL94VE method. That is, for achieving the above purpose, the amount of the flame retardant of the present invention is not more than ½ of the amount of a combined system of magnesium hydroxide and red phosphorus, and it is not more than 1/10 of the amount of magnesium hydroxide alone. Further, The flame retardant of the present invention remarkably reduces the degree of decrease in impact strength, particularly dupont impact strength.

It is not clear why the flame retardant of the present invention provides a high flame retardancy effect, e.g., an effect on drip prevention. However, the main reason therefor is assumed to be as follows. When a flame-retardant polyamide-containing resin composition is combusted, decomposition products from the epoxy resin and the polyamide-containing resin, e.g., an amine-containing compound and a carboxylic acid-containing compound, undergo a curing reaction to form a three-dimensional network structure.

The magnesium hydroxide used in the present invention may be surface-treated with a conventionally known surface treating agent as required. The amount of the surface treating agent per 100 parts by weight of the magnesium hydroxide is preferably approximately 0.1 to 10 parts by weight. The surface treating agent preferably includes higher fatty acids such as oleic acid and stearic acid, alkali metal salts of these higher fatty acids, silane coupling agents such as vinylethoxysilane, vinyl-tris(2-methoxy)silane, gamma-methacryloxypropyltrimethoxysilane, gamma-aminopropyltrimethoxysilane, beta-(3,4-epoxycyclohexyl)ethyltrimethoxysilane, gamma-glycidoxypropyltrimethoxysilane and gamma-mercaptopropyltrimethoxysilane, titanate-containing coupling agents such as isopropyltriisostearoyl titanate, isopropyltris(dioctylpyrophosphate)titanate, isopropyltri(N-aminoethyl-aminoethyl)titanate and isopropyltridecylbenzenesulfonyl titanate, aluminum-containing coupling agents such as acetoalkoxyaluminum diisopropylate, and partially esterflied products of orthophosphoric acid such as mono- or diestots from orthophosphoric acid and stearyl alcohol and partially esterflied products from orthophosphoric acid or an alkali metal salt.

The polyamide-containing resin used in the present invention includes resins containing a polyamide bond such as nylon 3, nylon 4, nylon 4-6, nylon 6T, nylon 6-6, nylon 6-10, nylon 6-12, nylon 8, nylon 9, nylon 11, nylon 12, polyamide MXD6, polyamide resin elastomer and a polyamide resin-containing polymer alloy resin.

The magnesium hydroxide used in the present invention preferably has an average particle diameter of 0.2 to 5 $\mu$m and an aspect ratio of 200 or less. The magnesium hydroxide as primary particles may have the form of a hexagonal plate or a needle, and a mixture of magnesium hydroxide having the form of a hexagonal plate and magnesium hydroxide having the form of a needle may be used. In general, magnesium hydroxide in the form of a needle tends to show a decrease in impact strength when it has a high aspect ratio. However, the flame-retardant polyamide-containing resin composition of the present invention shows high impact strength, since it contains a small amount of the flame retardant of the present invention. Further, the decrease in impact strength can be prevented by using fine particles of red phosphorus having a particle diameter of approximately 1 to 10 $\mu$m.

The red phosphorus used in the present invention preferably has an average particle diameter of approximately 1 to 50 $\mu$m. It may be surface-treated as required. The surface-treated red phosphorus preferably includes red phosphorus coated with an olefin, red phosphorus coated with a carboxylic acid polymer, red phosphorus coated with titanium oxide, red phosphorus coated with a titanium-aluminum condensate and red phosphorus coated with titanium-cobalt complex hydrate oxide.

The epoxy resin used in the present invention includes epoxy-containing resins such as a bisphenol A type epoxy resin, a alicyclic epoxy resin, a heterocylic epoxy resin, a phenol novolak type epoxy resin, a acryl-modified epoxy resin, a cresol-novolak type epoxy resin, an epoxidized olefin resin, a polyfunctional epoxy resin, an aliphatic epoxy resin, a polyphenol type epoxy resin, an epoxy-modified alkyd resin, a Polyglycidylamine type epoxy resin, an alcohol type epoxy resin and an ester type epoxy resin.

The amount of the epoxy resin per 100 parts by weight of the polyamide-containing resin is preferably 0.1 to 5 parts by weight. When the amount of the epoxy resin is less than the above lower limit, no sufficient flame retardancy can be obtained. When it exceeds the above upper limit, too large an amount of the epoxy resin undergoes a curing reaction with the polyamide-containing resin, and as a result, the composition has too high a viscosity and the processability of the composition decreases. Preferred is an epoxy resin having an epoxy content of at least 0.1 eq/kg. When an epoxy resin having an epoxy content of less than 0.1 eq/kg is used, the effect on improvement in flame retardancy is poor.

The magnesium hydroxide, red phosphorus and epoxy resin may be in the state of powders or liquids when these are incorporated into the polyamide-containing resin. In view of workability and productivity, it is preferred to use these components in the state of granules. With an increase in the content of the epoxy resin in the composition, the epoxy resin tends to increase the viscosity of the composition to degrade the fluidity thereof in processing the composition. For preventing the degradation of the fluidity in this case, there may be added any one of a lubricant, a plasticizer, a mold releasing agent and a reactive diluent.

The flame-retardant polyamide-containing resin composition of the present invention may be produced from the polyamide-containing resin, magnesium hydroxide, red phosphorus and epoxy resin by any mixing method. For example, there may be employed a method using a single-screw extruder or a twin-screw extruder. The polyamide-containing resin composition may be molded by any method such as an injection molding method, an extrusion molding method, a blow molding method or a press forming method.

The flame-retardant polyamide-containing resin composition of the present: invention may contain a variety of fillers, reinforcements and additives. Examples of the fillers, reinforcements and additives include an antioxidant, a metal inactivating agent, an ultraviolet light absorbing agent, a crosslinking agent, a curing agent, a foaming agent, a nucleating agent, a colorant, a glass fiber, a milled glass fiber, a glass powder, a carbon fiber, an inorganic fiber, an aromatic polyamide fiber, a metal fiber, metal flakes, a metal powder, fibrous basic magnesium sulfate, magnesium carbonate, clay, carbon black, antimony oxide and an improver for polymer alloy compatibility.

The present invention provides a flame retardant which can impart a polyamide-containing resin with flame retardancy without deteriorating the impact strength of the polyamide-containing resin, and the present invention also provides a flame-retardant polyamide-containing resin composition containing this flame retardant.

The present invention will be explained more in detail hereinafter by reference to Examples, in which "%" stands for "% by weight" unless otherwise specified.

EXAMPLE 1

EXAMPLES 1-9

A polyamide 6 resin of injection molding grade, magnesium hydroxide having a primary particle form of a hexagonal plate, having aBET specific surface area of 6 m$^2$/g and an average secondary particle diameter of 0.8 $\mu$m and surface-treated with oleic acid whose amount was 2% based on the magnesium hydroxide, red phosphorus having an -average secondary particle diameter of 25 $\mu$m (trade name Novared #120, supplied by Rinkagaku Kogyo Co., Ltd.), a phenol novolak type epoxy resin having an epoxy content of 4.3 eq/kg and an antioxidant (trade name Irganox 1098, supplied by Ciba Geigy) were preliminarily mixed in amounts shown in Table 1, and the mixture was melt-kneaded in a single-screw extruder at 250° C.

The above-prepared kneaded mixture was injection-molded with an injection molding machine at 250° C. to obtain test pieces (disks having a diameter of 50 mm and a thickness of 2 mm) for du Pont impact test and test pieces (notched) for an Izod impact test (JIS K7110). The test pieces were subjected to UL94EV test, du Pont impact test (impact application rod 3/16 inch) and Izod impact test (JIS K7110) under atmosphere of 23° C.±2° C. and 50%±5% RH. Table 1 shows the test results.

COMPARATIVE EXAMPLES 1-8

Examples 1 was repeated except that the amounts of magnesium hydroxide, red phosphorus and epoxy resin were changed as shown in FIG. 1. Table 1 shows the results.

TABLE 1

| | Flame retardant | | | | Anti-oxidant |
|---|---|---|---|---|---|
| | Polyamide 6 | Mg(OH)$_2$ | Red phosphorus | Eposy resin | |
| Ex. 1 | 100 | 10 | 6 | 1.5 (4.3) phenol.novolak type | 0.5 |
| Ex. 2 | 100 | 18 | 6 | 0.5 (4.3) phenol.novolak type | 0.5 |
| Ex. 3 | 100 | 18 | 5 | 1.5 (4.3) phenol.novolak type | 0.5 |
| Ex. 4 | 100 | 10 | 6 | 1.5 (4.5) phenol.novolak type | 0.5 |
| Ex. 5 | 100 | 10 | 6 | 1.5 (12.5) alicyclic epoxy resin | 0.5 |
| Ex. 6 | 100 | 15 | 8 | 3 alicyclic epoxy resin | 0.5 |
| Ex. 7 | 100 | 10 | 6 | 1.5 (6.5) ester type epoxy resin | 0.5 |
| Ex. 8 | 100 | 10 | 6 | 1.5 (8.8) polyglycidylamine type | 0.5 |
| Ex. 9 | 100 | 10 | 6 | 1.5 (4.8) polyphenol type | 0.5 |
| CEx. 1 | 100 | 0 | 0 | 0 | 0.5 |
| CEx. 2 | 100 | 180 | 0 | 0 | 0.5 |
| CEx. 3 | 100 | 36 | 8 | 0 | 0.5 |
| CEx. 4 | 100 | 36 | 6 | 0 | 0.5 |
| CEx. 5 | 100 | 120 | 0 | 0 | 0.5 |
| CEx. 6 | 100 | 120 | 0 | 1.5 (4.3) phenol.novolak type | 0.5 |
| CEx. 7 | 100 | 0 | 18.5 | 0 | 0.5 |
| CEx. 8 | 100 | 0 | 17 | 1.5 (4.3) phenol.novolak type | 0.5 |

Notes:
Ex. = Example, CEx. = Comparative Example
Parenthesized figures show epoxy contents (eq/kg) of epoxy resins.
Amounts are parts by weight

| | Flame retardancy UL94VE | | Impact strength 23° C. 50% RH | |
|---|---|---|---|---|
| | 1/16 inch | 1/8 inch | du Pont impact strength value | Izod impact strength value |
| Ex. 1 | V-0 | V-0 | 130 | 7.6 |
| Ex. 2 | V-0 | V-0 | 80 | 6.9 |
| Ex. 3 | V-0 | V-0 | 80 | 6.8 |
| Ex. 4 | V-0 | V-0 | 120 | 7.7 |
| Ex. 5 | V-0 | V-0 | 120 | 7.4 |
| Ex. 6 | V-0 | V-0 | 70 | 6.5 |
| Ex. 7 | V-0 | V-0 | 120 | 7.3 |
| Ex. 8 | V-0 | V-0 | 130 | 7.7 |
| Ex. 9 | V-0 | V-0 | 130 | 7.5 |
| CEx. 1 | HB | V-2 | 200 or more | 9.5 |
| CEx. 2 | V-0 | V-0 | 5 or less | 0.5 |
| CEx. 3 | V-0 | V-0 | 5 | 4.3 |
| CEx. 4 | V-2 | V-0 | 8 | 4.6 |
| CEx. 5 | V-2 | V-0 | 5 or less | 1.5 |
| CEx. 6 | V-2 | V-0 | 5 or less | 1.5 |
| CEx. 7 | V-2 | V-1 | 10 | 4.4 |
| CEx. 8 | V-2 | V-1 | 10 | 4.2 |

Notes:
Ex. = Example, CEx. = Comparative Example
Unit of du Pont impact strength value = kgf · cm
Unit of izod impact strength value = kgf · cm/cm
Amounts are parts by weight

EXAMPLE 10 AND COMPARATIVE EXAMPLE 9

Example 1 was repeated except that the red phosphorus was replaced with milled red phosphorus having a particle diameter of 5 μm. Further, the above procedures were repeated except that the amounts of the components were changed as shown in Table 2. Table 2 shows the results.

molding grade. Further, the above procedures were repeated except that the amounts of the components were changed as shown in Table 2. Table 2 shows the results.

TABLE 2

| | Flame retardant | | | | |
|---|---|---|---|---|---|
| | Polyamide | Mg(OH)$_2$ | Red phosphorus | Epoxy resin | Anti-oxidant |
| Ex. 10 | 100 | 10 | 6 | 1.5 (4.3) phenol.novolak type | 0.5 |
| CEx. 9 | 100 | 36 | 8 | 0 | 0.5 |
| Ex. 11 | 100 | 10 | 6 | 1.5 (4.3) phenol.novolak type | 0.5 |
| CEx. 10 | 100 | 36 | 8 | 0 | 0.5 |
| Ex. 12 | 100 | 10 | 6 | 1.5 (4.3) phenol.novolak type | 0.5 |
| CEx. 11 | 100 | 0 | 0 | 0 | 0.5 |
| CEx. 12 | 100 | 36 | 8 | 0 | 0.5 |

| | Flame retardancy UL98VE | | Impact strength 23° C. 50% RH | |
|---|---|---|---|---|
| | 1/16 inch | 1/8 inch | du Pond impact strength value | Izod impact strength value |
| Ex. 10 | V-0 | V-0 | 180 | 9.0 |
| CEx. 9 | V-0 | V-0 | 20 | 6.2 |
| Ex. 11 | V-0 | V-0 | 100 | 7.1 |
| CEx. 10 | V-0 | V-0 | 10 | 3.1 |
| Ex. 12 | V-0 | V-0 | 150 | 12.4 |
| CEx. 11 | HB | V-2 | 200 or more | 15.5 |
| CEx. 12 | V-0 | V-0 | 10 | 7.6 |

Notes:
Ex. = Example, CEx. = Comparative Example
Units of impact strengths values = as defined in Table 1.
Amounts are parts by weight

EXAMPLE 11 AND COMPARATIVE EXAMPLE 10

Example 1 was repeated except that the magnesium hydroxide was replaced with magnesium hydroxide having a primary particle form of a needle, having an average diameter of 0.2 μm, an average length of 20 μm and a BET specific surface area of 15 m²/g and surface-treated with oleic acid whose amount was 2% based on the magnesium hydroxide. Further, the above procedures were repeated except that the amounts of the components were changed as shown in Table 2. Table 2 shows the results.

EXAMPLE 12 AND COMPARATIVE EXAMPLES 11 AND 12

Example 1 was repeated except that the polyamide resin was replaced with a nylon 12 resin of injection

What is claimed is:

1. A flame-retardant polyamide-containing resin composition containing 100 parts by weight of an aliphatic polyamide-containing resin, 2 to 50 parts by weight of magnesium hydroxide, 1 to 15 parts by weight of red phosphorus and 0.1 to 5 parts by weight of an :epoxy resin.

2. A composition according to claim 1, wherein the magnesium hydroxide has an average particle diameter of 0.2 to 5 μm and an aspect ratio of 200 or less.

3. A composition according to claim 1, wherein the red phosphorus has an average particle diameter of 1 to 50 μm.

4. A composition according to claim 1, wherein the epoxy resin has an epoxy content of at least 0.1 eq/kg.

* * * * *